3,009,811
ADIPIC ACID COMPOSITION
Stanley P. Raffensperger, Palos Park, and Thomas T. Takashima, La Grange, Ill., assignors to General Foods Corporation, White Plains, N.Y., a corporation of Delaware
No Drawing. Filed July 23, 1959, Ser. No. 828,950
14 Claims. (Cl. 99—78)

The following invention relates to an improved method of increasing the solubility rate of adipic acid in cold water and, in particular, the solubility rate of adipic acid in fruit flavored beverages prepared by dissolving a dry beverage mix in cold water.

In the past, citric acid has been employed as an acidulant in dry beverage mixes capable of being dissolved in cold water. In addition to citric acid, such mixes usually contain other hydroscopic materials such as sugars and the like. Such compositions are relatively unstable if stored for extended periods of time since they readily absorb moisture and cake upon standing. The storage problem encountered with such dry beverage mixes has always been of great concern to those skilled-in-the-art and in particular the storage problems encountered in warm, humid climates. Adipic acid has many properties which make it desirable for commercial use in such products. However, such uses are limited due to the fact that adipic acid has a very low rate of solubility in cold water. While the dry beverage mixes of commerce must dissolve in cold water in less than one minute, the use of adipic acid in such mixes in the past has been impossible due to the fact that the adipic acid does not dissolve rapidly in cold water, periods as long as twenty-four hours at times not being sufficient to put all of the adipic acid into solution.

It is an object of this invention to prepare an adipic acid composition which has an increased rate of solubility in cold water. It is a further object of this invention to prepare an adipic acid composition which when used in cold water soluble beverage mixes will not absorb substantial amounts of moisture upon standing and will be readily and easily soluble in cold water. It is a further object of this invention to prepare an adipic acid composition which when used in cold water soluble beverage mixes will prevent the occurrence of chemical reactions during storage which cause degradation of the beverage flavor and color. It is still a further object of this invention to prepare an adipic acid composition which when used in cold water soluble beverage mixes containing sucrose will prevent the undesirable inversion of the sucrose. Further objects of this invention will be apparent from a reading of the specification.

It has now been discovered that the rate of solubility of adipic acid may be increased by mixing adipic acid with a partial long chain fatty acid ester of a polyoxyethylene derivative of a hexitol anhydride derived from sorbitol. It is not known exactly how or why these derivatives improve the rate of solubility of adipic acid, but it is believed that these derivatives have a solubilizing effect over and above that effect obtained by reducing adipic acid to a fine powder.

While the addition of a partial long chain fatty acid ester of a polyoxyethylene derivative of a hexitol anhydride derived from sorbitol produces extremely satisfactory results, it has further been found that the addition of a small amount of propylene glycol enhances the effect of the polyoxyethylene derivative when in combination with adipic acid in that the level of the derivative required to effect a high rate of solubility is substantially reduced. While water soluble derivatives such as polyoxyethylene sorbitan monolaurate (Tween 20), polyoxyethylene sorbitan palmitate (Tween 40), polyoxyethylene sorbitan monooleate (Tween 80) and the like may be employed, it is preferred to employ polyoxyethylene sorbitan stearate (Tween 60).

In producing the adipic acid compositions according to certain aspects of this invention, the adipic acid is preferably ground to effect size reduction, typically particle sizes of about 40 to 400 U.S. standard mesh are desirable and preferably a particle size of about 100–300 U.S. standard mesh.

The so ground adipic acid may then be mixed with polyoxyethylene sorbitan stearate, although other polyoxyethylene sorbitan fatty acid esters may be employed. Preferably, the amount of polyoxyethylene sorbitan stearate will be in an amount sufficient to coat the adipic acid particles but in an amount insufficient to cause the particles to clump together. Preferably, for each part by weight of adipic acid about 0.1 to 1.5% of polyoxyethylene sorbitan stearate may be employed and preferably 0.7%. The adipic acid and polyoxyethylene sorbitan stearate are blended and then ground to reduce the particle size so that the particles will pass through about a 100 to 400 U.S. standard mesh screen and preferably 100% through a 300 U.S. standard mesh screen. It is preferred when adding the polyoxyethylene sorbitan stearate to adipic acid that the polyoxyethylene sorbitan stearate be at a temperature of at least room temperature.

In the preferred embodiment, 0.7% polyoxyethylene sorbitan stearate by weight of the adipic acid and about 0.1 to 1.0% and preferably about 0.25% of propylene glycol by weight of the adipic acid are added to the adipic acid powder. It has been found that the propylene glycol assists in the coating of the adipic acid with polyoxyethylene sorbitan stearate and in addition permits a reduction in the amount of polyoxyethylene sorbitan stearate which may be employed. Thus, in the case where polyoxyethylene sorbitan stearate is employed without propylene glycol, it is necessary to employ about 0.2 to 2.0% polyoxyethylene sorbitan stearate by weight of the adipic acid whereas if about 0.1 to 1.0% of propylene glycol by weight of the adipic acid is employed in addition to the polyoxyethylene sorbitan stearate, then it is only necessary to employ about 0.1 to 1.5% polyoxyethylene sorbitan stearate by weight of the adipic acid. Furthermore, the propylene glycol reduces the amount of dust produced when the preferred particle size of adipic acid is such that it is necessary to finely grind the adipic acid.

The following example illustrates one embodiment of the present invention but it is to be understood that this example is for purposes of illustration only and that the invention is not limited thereto since various changes can be made by those skilled-in-the-art without departing from its scope and spirit.

Five hundred pounds of adipic acid having a mesh size of 100 U.S. standard mesh is mixed with 1.25 pounds of propylene glycol and 3.5 pounds of polyoxyethylene sorbitan stearate which have previously been mixed and blended at 120° F. The mixture of adipic acid, propylene glycol and polyoxyethylene sorbitan stearate is well blended and then ground to reduce the size of the adipic acid particles to particles of a size which will pass through a 200 U.S. standard mesh screen. When polyoxyethylene sorbitan stearate is employed in combination with the adipic acid, less difficulty is encountered in grinding the adipic acid since the amount of dusting is reduced.

The untreated adipic acid has a solubility rate of 4.8 grams per two quarts of water in 6 to 10 minutes when dissolved in water at 45° F. whereas the adipic acid composition prepared according to the present invention has a solubility rate of 4.8 grams per two quarts of water in 1 to 3 minutes when dissolved in water at 45° F.

The adipic acid composition of the present invention may be employed wherever it is desired to utilize adipic acid in cold water where a relatively rapid rate of solubility is required. One such use is in fruit flavored beverage mixes which are dissolved in very cold water. Such mixes typically contain sugars, an edible acid, flavoring and coloring. A typical fruit flavored beverage mix composition as employed in this invention is:

| | |
|---|---|
| Adipic acid | 20.00–35.00 parts by weight. |
| Fruit flavor (natural or imitation—fixed in gum arabic) | .25–1.75 parts by weight. |
| Color (FD & C—certified food coloring) | .10–1.25 parts by weight. |
| Dextrose hydrate or sucrose | Sufficient to bring the total parts by weight to 100. |

17.7 grams of the above mix may be dissolved in two quarts of cold water and to this solution may be added 1–1.5 cups of sugar to prepare a fruit flavored beverage. As an alternative, the sugar may be incorporated in the dry beverage mix rather than being added after the mix has been dissolved.

Fruit flavored beverage mixes which contain the adipic acid composition of the present invention in combination with a hydroscopic sugar such as sucrose or the like exhibit little or no caking after extended periods of storage, and after such time, can be dissolved in cold water within several minutes.

What is claimed is:

1. A method of preparing an adipic acid-containing composition having an increased rate of solubility which comprises mixing a partial long chain fatty acid ester of a polyoxyethylene derivative of a hexitol anhydride derived from sorbitol with adipic acid powder.

2. A method of preparing an adipic acid-containing composition having an increased rate of solubility which comprises mixing a partial long chain fatty acid ester of a polyoxyethylene derivative of a hexitol anhydride derived from sorbitol with adipic acid powder and finely grinding said mixture.

3. A method of preparing an adipic acid-containing composition having an increased rate of solubility which comprises coating a partial long chain fatty acid ester of a polyoxyethylene derivative of a hexitol anhydride derived from sorbitol on adipic acid and finely grinding said coated adipic acid powder.

4. A method according to claim 3 wherein said coated adipic acid powder is ground to the extent that 100% passes through a 300 U.S. standard mesh screen.

5. A method according to claim 3 wherein said ester of a polyoxyethylene derivative is mixed with propylene glycol.

6. A method according to claim 5 wherein the coating composition of said ester of a polyoxyethylene derivative and propylene glycol is heated to a temperature of at least room temperature prior to being coated on said adipic acid powder.

7. A method according to claim 5 wherein the coating composition of said ester of a polyoxyethylene derivative and propylene glycol is heated to a temperature of 120° F. prior to being coated on said adipic acid powder.

8. A method according to claim 3 wherein said ester of a polyoxyethylene derivative is polyoxyethylene sorbitan stearate.

9. An adipic acid-containing composition having an increased rate of solubility in cold water which comprises a finely ground adipic acid powder coated with a partial long chain fatty acid ester of a polyoxyethylene derivative of a hexitol anhydride derived from sorbitol.

10. An adipic acid-containing composition having an increased rate of solubility in cold water which comprises a finely ground adipic acid powder coated with a partial long chain fatty acid ester of a polyoxyethylene derivative of a hexitol anhydride derived from sorbitol and propylene glycol.

11. An adipic acid-containing composition having an increased rate of solubility in cold water which comprises an adipic acid powder coated with 0.2 to 2.0% polyoxyethylene sorbitan stearate by weight of the adipic acid.

12. An adipic acid-containing composition having an increased rate of solubility in cold water which comprises an adipic acid powder coated with 0.1 to 1.5% polyoxyethylene sorbitan stearate by weight of the adipic acid and 0.1 to 1.0% propylene glycol by weight of the adipic acid.

13. An adipic acid-containing composition having an increased rate of solubility in cold water which comprises an adipic acid powder coated with 0.7% polyoxyethylene sorbitan stearate by weight of the adipic acid and 0.35% propylene glycol by weight of the adipic acid.

14. A cold water soluble fruit flavored beverage mix which comprises 20.00–35.00 parts by weight of an adipic acid-containing composition having an increased rate of solubility in cold water comprised of finely ground adipic acid powder coated with a partial long chain fatty acid ester of a polyoxyethylene derivative of a hexitol anhydride derived from sorbitol, .25–1.75 parts by weight of fixed fruit flavor, .10–1.25 parts by weight of color and sufficient dextrose hydrate to bring the total parts by weight to 100.

References Cited in the file of this patent

UNITED STATES PATENTS

| | | |
|---|---|---|
| 2,436,086 | Baier | Feb. 17, 1948 |
| 2,463,962 | Gorcica et al. | Mar. 8, 1949 |
| 2,694,641 | Atwood et al. | Nov. 16, 1954 |
| 2,824,807 | Laster et al. | Feb. 25, 1958 |
| 2,868,646 | Schapiro | Jan. 13, 1959 |